United States Patent
Reid et al.

(10) Patent No.: US 8,872,651 B2
(45) Date of Patent: Oct. 28, 2014

(54) WIRELESS PROBE SYSTEM AND METHOD FOR A FUELING ENVIRONMENT

(75) Inventors: Kent Reid, Canton, CT (US); James J. Longworth, Avon, CT (US); Donald A. Kunz, South Windsor, CT (US)

(73) Assignee: Veeder-Root Company, Simsbury, CT (US)

( * ) Notice: Subject to any disclaimer, the term of this patent is extended or adjusted under 35 U.S.C. 154(b) by 1448 days.

(21) Appl. No.: 12/487,787

(22) Filed: Jun. 19, 2009

(65) Prior Publication Data

US 2009/0256700 A1    Oct. 15, 2009

Related U.S. Application Data

(63) Continuation of application No. 11/010,809, filed on Dec. 13, 2004, now Pat. No. 7,561,040.

(51) Int. Cl.
 *G08B 1/08* (2006.01)
 *G08C 17/02* (2006.01)
 *H04Q 9/00* (2006.01)

(52) U.S. Cl.
 CPC . *G08C 17/02* (2013.01); *H04Q 9/00* (2013.01)
 USPC ............... 340/539.26; 340/539.13; 340/540; 340/541; 340/605; 340/620; 340/623; 340/624; 340/854.6; 340/5.6; 340/8.1; 340/10.2

(58) Field of Classification Search
 USPC ............. 340/539.26, 539.13, 540, 541, 605, 340/620, 623, 624, 854.6, 5.6, 8.1, 10.2
 See application file for complete search history.

(56) References Cited

U.S. PATENT DOCUMENTS

| | | |
|---|---|---|
| 4,459,584 A | 7/1984 | Clarkson |
| 4,736,193 A | 4/1988 | Slocum et al. |
| 4,850,223 A | 7/1989 | Carlin et al. |
| 4,882,765 A | 11/1989 | Maxwell et al. |
| 4,999,900 A | 3/1991 | Anderson |
| 5,056,107 A | 10/1991 | Johnson et al. |
| 5,156,042 A | 10/1992 | Carlin et al. |
| 5,202,667 A | 4/1993 | Alvin |
| 5,363,093 A | 11/1994 | Williams et al. |
| 5,708,424 A | 1/1998 | Orlando et al. |

(Continued)

FOREIGN PATENT DOCUMENTS

WO    WO 02/09061    1/2002

OTHER PUBLICATIONS

Communication from the European Patent Office dated May 25, 2010 regarding copending European Patent Application No. 05 853 674.9-1249.

(Continued)

*Primary Examiner* — Tai T Nguyen
(74) *Attorney, Agent, or Firm* — Nelson Mullins Riley & Scarborough, LLP

(57) ABSTRACT

A fueling environment is equipped with leak detection probes and liquid level probes. Each of the probes is associated with a wireless transceiver. The wireless transceivers send probe data to a site communicator wireless transceiver. To ensure that the site communicator receives the probe data, repeaters are used within the fueling environment. The repeaters receive the probe data, and some period of time after the sensor transceivers stop transmitting, the repeaters retransmit the probe data to the site communicator. The site communicator discards duplicative information and processes the probe data as needed.

36 Claims, 8 Drawing Sheets

(56) References Cited

U.S. PATENT DOCUMENTS

| | | | |
|---|---|---|---|
| 5,748,104 A * | 5/1998 | Argyroudis et al. | 340/870.11 |
| 5,757,664 A | 5/1998 | Rogers et al. | |
| 5,765,433 A | 6/1998 | Johnson | |
| 5,785,100 A | 7/1998 | Showalter et al. | |
| 5,854,994 A | 12/1998 | Canada et al. | |
| 5,890,520 A | 4/1999 | Johnson, Jr. | |
| 5,939,634 A | 8/1999 | Johnson | |
| 5,979,233 A | 11/1999 | Johnson | |
| 6,202,484 B1 | 3/2001 | Willner et al. | |
| 6,223,765 B1 | 5/2001 | Small et al. | |
| 6,369,715 B2 | 4/2002 | Bennett, Jr. et al. | |
| 6,374,187 B1 | 4/2002 | Knight et al. | |
| 6,401,045 B1 | 6/2002 | Rogers et al. | |
| 6,437,692 B1 * | 8/2002 | Petite et al. | 340/540 |
| 6,470,288 B1 | 10/2002 | Keidel et al. | |
| 6,662,649 B1 | 12/2003 | Knight et al. | |
| 6,700,503 B2 | 3/2004 | Masar et al. | |
| 6,801,835 B2 | 10/2004 | Covington et al. | |
| 6,834,534 B2 | 12/2004 | Halla et al. | |
| 6,967,589 B1 * | 11/2005 | Peters | 340/854.6 |
| 6,997,042 B2 | 2/2006 | Hutchinson et al. | |
| 7,051,576 B2 | 5/2006 | Hutchinson et al. | |
| 7,142,107 B2 | 11/2006 | Kates | |
| 7,218,237 B2 | 5/2007 | Kates | |
| 7,251,983 B2 | 8/2007 | Hutchinson | |
| 2001/0028305 A1 | 10/2001 | Bennett, Jr. | |
| 2001/0034567 A1 | 10/2001 | Allen et al. | |
| 2003/0025600 A1 | 2/2003 | Blanchard | |
| 2004/0020271 A1 | 2/2004 | Hutchinson | |
| 2004/0129726 A1 | 7/2004 | Hutchinson | |

OTHER PUBLICATIONS

Response to First Office Action from the State Intellectual Property Office, P.R. China for Chinese Patent Application for Invention No. 200580042629.1 filed on Mar. 5, 2010 (along with an English translation of the Response).

Written Opinion of the International Searching Authority (Apr. 25, 2006) regarding PCT/US2005/044807.

Communication pursuant to Article 96(2) (Sep. 25, 2007) regarding corresponding European Patent Application 05853674.9-1249.

Response to Article 96(2) Communication (Apr. 3, 2008) regarding corresponding European Patent Application 05853674.9-1249.

First Office Action from the State Intellectual Property Office, P.R. China, dated Aug. 21, 2009.

* cited by examiner

WIRELESS PROBE SYSTEM AND METHOD FOR A FUELING ENVIRONMENT

CROSS-REFERENCE TO RELATED APPLICATIONS

This application is a continuation of application Ser. No. 11/010,809 filed Dec. 13, 2004, now U.S. Pat. No. 7,561,040. The foregoing application is hereby relied upon and incorporated in its entirety as if set forth verbatim herein

FIELD OF THE INVENTION

The present invention is directed to a leak detection system in a fueling environment, and, more particularly, is directed to a system that includes sensors that report wirelessly to a site controller or tank monitor in the fueling environment.

BACKGROUND OF THE INVENTION

Fueling environments are being subjected to increasingly rigorous statutes and regulations that prohibit fuel leaks and detail how leaks are to be detected within the fueling environment. One particular area in which leak detection is critical is in the storage tank in which the fuel is stored prior to sale. Such storage tanks, which are typically located beneath the ground, and thus, are commonly referred to as "underground storage tanks", are typically equipped with a probe that measures the height of the fluid within the storage tank. Additionally, the probe may measure temperature, pressure, and other environmental factors that are used in determining the volume of fluid within the storage tank. These factors are then reported to a tank monitor or other site controller to determine if the tank is leaking and for inventory reconciliation.

In the past, the probe reported the factors and parameters through an electromagnetic signal sent over a wirebased system. While adequate for its intended purpose, such wirebased systems have at least two drawbacks. The first drawback to conventional systems is that the communication wires must be routed through an intrinsically safe conduit to reduce the risk of explosion. Such intrinsically safe conduit is expensive, raising the cost of compliance to the fueling environment operator. The second drawback to the conventional systems is that the communication wires must run from the underground storage tank to the tank monitor, which is usually located in the central office of the fueling environment. These communication wires are typically run underneath the concrete slab that forms the fueling environment's forecourt. If the communication wires are damaged or need to be replaced, the entire forecourt is disrupted as the concrete slab is broken, and the communication wires excavated. Thus, it is difficult to upgrade or repair existing systems without great expense and disruption to the ordinary course of business for the fueling environment.

The current leak detection statutes and regulations extend beyond just the underground storage tank and affect the entire piping system of the fueling environment. Thus, sumps associated with the piping system likewise have leak detection probes. These sumps may be positioned underneath the fuel dispensers, at low points in the piping system, or other locations as needed. The sump probes are usually liquid level sensors and generally lack some of the sophistication of the underground storage tank probe. However, this relative lack of sophistication does not lessen the complications associated with establishing the communication link to the tank monitor or other site controller. Specifically, the sump is considered to have the potential for fuel vapors therein, and thus, the environment must be intrinsically safe. The wiring for the sump probe is also usually run underneath the concrete slab of the forecourt. The intrinsically safe requirement and the need to run wires under the forecourt mean that such sump probes likewise increase expense for the fueling environment operator.

A few systems have proposed a wireless communication link between the tank probe and the tank monitor in an effort to alleviate costs associated with the conventional wire based systems. While seemingly simple in concept, such systems have run into implementation difficulties. Specifically, the large metallic bodies of cars that move around the fueling environment may create unpredictable capacitive and inductive elements in the signal path, thereby disrupting the signal path. In extreme cases, the cars may cause the signal to be canceled. Even when the impact of the cars does not cancel the signal, the concrete slab and other environmental factors help attenuate the signal from the probe such that the tank monitor's receiver does not receive an interpretable signal. While it is conceivably possible to boost the wireless signal from the probe sufficiently to overcome the variable attenuation of the forecourt, this is not always an optimal solution as more power is required to boost the signal in this manner. The wires and circuitry providing power to the sump may not be able to handle the increased load associated with the increased power supply. Even if the power level can be boosted to a level strong enough to reach the tank monitor, the signals with the increased power may exceed the emission limits permitted by the Federal Communication Commission (FCC).

Thus, an improved system is needed that allows sensors and probes within sumps to communicate wirelessly with the tank monitor or site controller of a fuel environment.

SUMMARY OF THE INVENTION

The present invention solves the problems of the prior art systems by introducing wireless repeaters to the fueling environment to work in conjunction with wireless transmitters associated with probes. Specifically, the sumps and underground storage tanks are provided with liquid level probes, leak detection probes, and/or other comparable sensors, which generically are called "sensors" herein, to detect various conditions in the fueling environment. Each sensor communicates with a wireless transceiver. A site communicator is likewise associated with a wireless transceiver adapted to communicate with the wireless transceivers of the sensors. Furthermore, one or more repeaters are associated with a repeater transceiver and are positioned within the fueling environment. The repeaters are adapted to receive signals from the sensor transceivers and retransmit the signals from the sensor transceivers to the site communicator transceiver.

In a preferred embodiment, the site communicator transceiver emits a relatively strong beacon signal periodically. The sensor transceivers receive this beacon signal and synchronize thereto. Once synchronized, each sensor transceiver receives sensor data from the sensor. The sensor transceivers then transmit the sensor data through an antenna. Ideally, the site communicator transceiver receives the transmitted sensor data and sends an acknowledgement signal. However, recognizing that circumstances may not be ideal, the repeater is also positioned such that it receives the transmitted sensor data. A predetermined amount of time after the repeater receives the transmitted sensor data, the repeater appends a repeater identification to the transmitted sensor data, and transmits the transmitted sensor data (along with the appended repeater identification) to the site communicator transceiver.

The site communicator now potentially has two copies of the same transmitted signal data: one from the sensor transceiver, and one from the repeater. The site communicator checks to see if it has received two copies of the signal data. If the site communicator has received two copies, then the copy from the repeater is discarded, and the copy from the sensor transceiver is used in a conventional fashion. If the site communicator does not have two copies, then the site communicator uses the copy from the repeater in place of the missing copy from the sensor transceiver.

Several variations on the present invention exist. In an alternate embodiment, the site communicator never sends an acknowledgment signal, and the repeater always sends the transmitted sensor data (along with the appended repeater identification) to the site communicator transceiver. In another alternate embodiment, the repeater delays a random amount of time to transmit the transmitted sensor data (along with the appended repeater identification) to the site communicator transceiver. The randomness of the time delay may help minimize the risk of interference from other signals from other repeaters. The sensor and the sensor transceiver may be powered by batteries, or may draw power from nearby components such as the fuel dispenser. Likewise, the repeater may have a battery power source or may draw power from a nearby component such as the fuel dispenser. The housing for the sensor transceiver should ideally be leak resistant, and may optionally be intrinsically safe. The protocol between the various components may also be varied. For example, in an alternate embodiment, if the site communicator transceiver sends out an acknowledgement signal before the repeater sends its copy of the transmitted sensor data, the repeater may not send the duplicate copy to the site communicator transceiver.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention associates wireless transceivers with probes in a fueling environment. To help ensure that the wireless signals being generated by the wireless transceivers reach a wireless transceiver associated with a fueling environment site communicator, the present invention positions repeaters at various locations within the fueling environment. The repeaters receive the signals from the probe transceivers and repeat the transmissions such that the site communicator transceiver receives at least one copy of the probe data. Before discussing the operational aspects of the present invention starting with FIG. 6, the system components and fueling environment are discussed, as illustrated in FIGS. 1-5.

Figure 1:
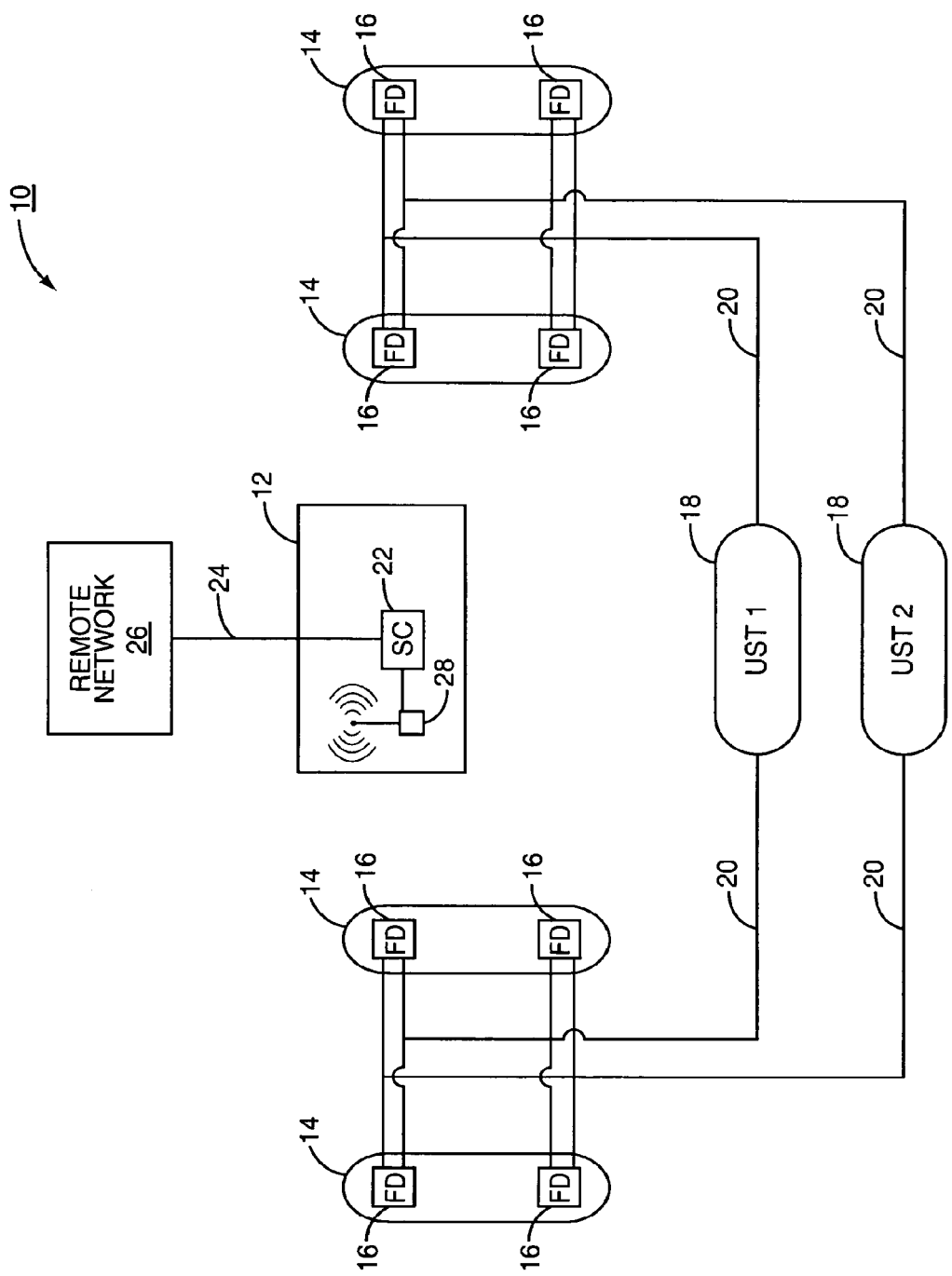
FIG. 1 illustrates a simplified view of a fueling environment.

FIG. 1 illustrates a fueling environment 10, which may include a central building 12. This central building 12 may house a convenience store, a quick serve restaurant, a service garage, or the like, as is well understood. While such central buildings 12 are "central" in the sense that they are the focal point of the fueling environment 10, such central buildings 12 need not be positioned in the "center" of the fueling environment 10. The fueling environment 10 further has a number of fueling islands 14 upon which fuel dispensers 16 (also labeled "FD" in FIG. 1) are positioned. The fuel dispensers 16 provide fuel to consumers through hoses and nozzles, as is well understood. The fuel provided to the consumers is typically stored in one or more underground storage tanks (UST) 18 (also labeled "UST 1" and "UST 2" in FIG. 1). The USTs 18 contain fuel that is delivered to the fuel dispensers 16 through a piping network 20 using a submersible turbine pump (not shown).

A site communicator 22 (also labeled "SC" in FIG. 1) may be positioned in the central building 12 and has a communication link 24 that communicates with a remote network 26, such as the Internet, for example, as needed or desired. Until this point, the fueling environment 10 is essentially conventional. The present invention associates a site communicator wireless transceiver 28 with the site communicator 22. The function of the site communicator wireless transceiver 28 is explained in greater detail below. While the site communicator wireless transceiver 28 is shown inside central building 12, it should be appreciated that site communicator wireless transceiver 28 may be positioned externally on the central building 12, or other location as desired.

The fuel dispensers 16 may be the ENCORE® or ECLIPSE® fuel dispensers sold by Gilbarco Inc. of Greensboro, N.C., or other suitable fuel dispenser as needed or desired. The USTs 18 are preferably double-walled underground storage tanks and may conform to the description of the underground storage tanks presented in U.S. patent application Ser. Nos. 10/209,962; 10/337,221; and 10/390,346, which are hereby incorporated by reference in their entireties. In FIG. 1, UST 1 may hold low octane fuel and UST 2 may hold high octane fuel, with an intermediate octane fuel being achieved by blending, as is well understood. The piping network 20 preferably uses double-walled piping, and may conform to the description of the piping networks presented in U.S. patent application Ser. Nos. 10/238,822; 10/430,890; and 10/703,156, which are hereby incorporated by reference in their entireties.

The site communicator 22 may be the G-SITE® or PASS-PORT® point of sale systems sold by Gilbarco Inc. of Greensboro, N.C., or more preferably may be one of the various tank monitors, such as the TLS 350, sold by Veeder-Root Company of Simsbury, Conn., the assignee of the present invention. Both site controllers and tank monitors are collectively referred to as site communicators, because they provide the gateway for communication between elements of the fueling environments. Other comparable site communicators may also be used as needed or desired. The connection to the remote network 26 is not required for a device to be considered a site communicator. The communication link 24 may be a two-wire, T1, ISDN, phone line, or other communication link, although a wideband communication link is preferred.

Figure 2:
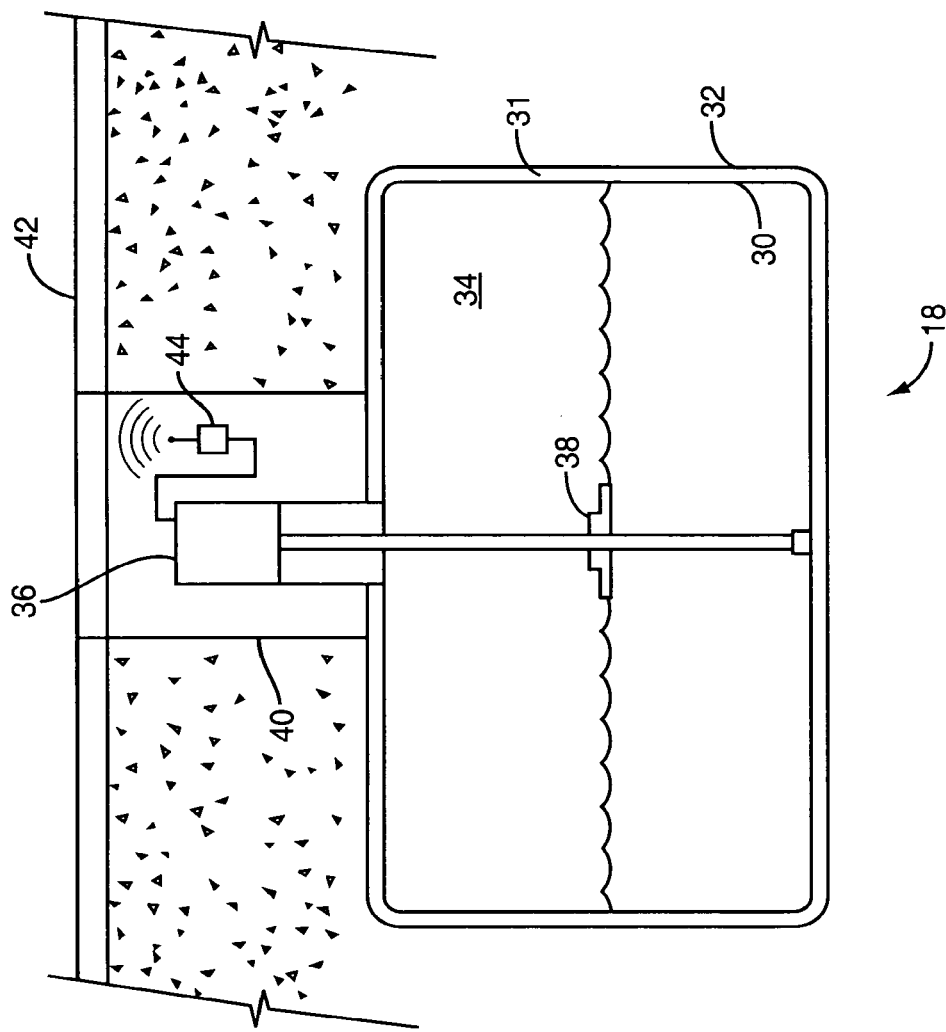
FIG. 2 illustrates a sump associated with an underground storage tank and a transceiver of the present invention positioned within the sump.

A UST 18 is illustrated in FIG. 2. The UST 18 is preferably a double-walled UST with inner wall 30 and outer wall 32 forming an interstitial space 31 therebetween. The interstitial space 31 may contain leaks, as is well understood. The inner wall 30 delimits an interior chamber 34 in which fuel is stored. A tank probe 36 measures the level of fuel within the interior chamber 34. In an exemplary embodiment, the tank probe 36 measures the level of the fuel through a float 38. The tank probe 36 may be the MAG 1 LEAK DETECTION PROBE or similar device sold by Veeder-Root Company. Alternate probes may be used if needed or desired. These probes or sensors may detect leaks or other conditions within the fueling environment as needed or desired. Exemplary conditions include, but are not limited to: vapor pressure, temperature, the presence or absence of fluid, the presence or absence of hydrocarbons, the presence or absence of oxygen or other atmospheric component, environmental factors, and the like.

The head of tank probe 36 is positioned within a fill sump 40. Fill sumps 40 are designed to allow the UST 18 to be refilled, and are thus positioned low beneath a forecourt concrete slab 42, and may have a manhole or similar access means positioned thereover. The manhole is removed, and the flexible pipes from the tanker are extended through the fill sump 40 into the interior chamber 34 when the UST 18 is being refilled.

In an alternate, non-illustrated embodiment, the tank probe 36 may be positioned within a sump designed to hold a submersible turbine pump (STP), such as the STP disclosed in U.S. Pat. No. 6,223,765, which is hereby incorporated by reference in its entirety. If the tank probe 36 were so positioned in the STP sump, the tank probe 36 would extend from the STP sump into the UST 18 in a fashion substantially similar to that illustrated for the fill sump 40, making allowances for the position of the STP.

The tank probe 36 is associated with a tank wireless transceiver 44 according to the present invention. The tank probe 36 is connected to the tank wireless transceiver 44 via a conventional probe cable, such as an RS-485 cable. The tank wireless transceiver 44 receives standard probe signals relating to the tank probe 36's measurements and formats the signals from tank probe 36 onto a carrier signal for transmission to the site communicator wireless transceiver 28. It should be appreciated that the formatting of the signals may take place in a signal processor (not shown) that is associated with the tank wireless transceiver 44. This signal processor may be integrally formed with tank wireless transceiver 44, with tank probe 36, or a separate device as needed. As used herein, "formatted for transmission by the transceiver," and permutations thereof, include a signal processor associated with the transceiver formatting the data for the transmission, regardless of whether the signal processor is integrated into the transceiver.

Figure 3:
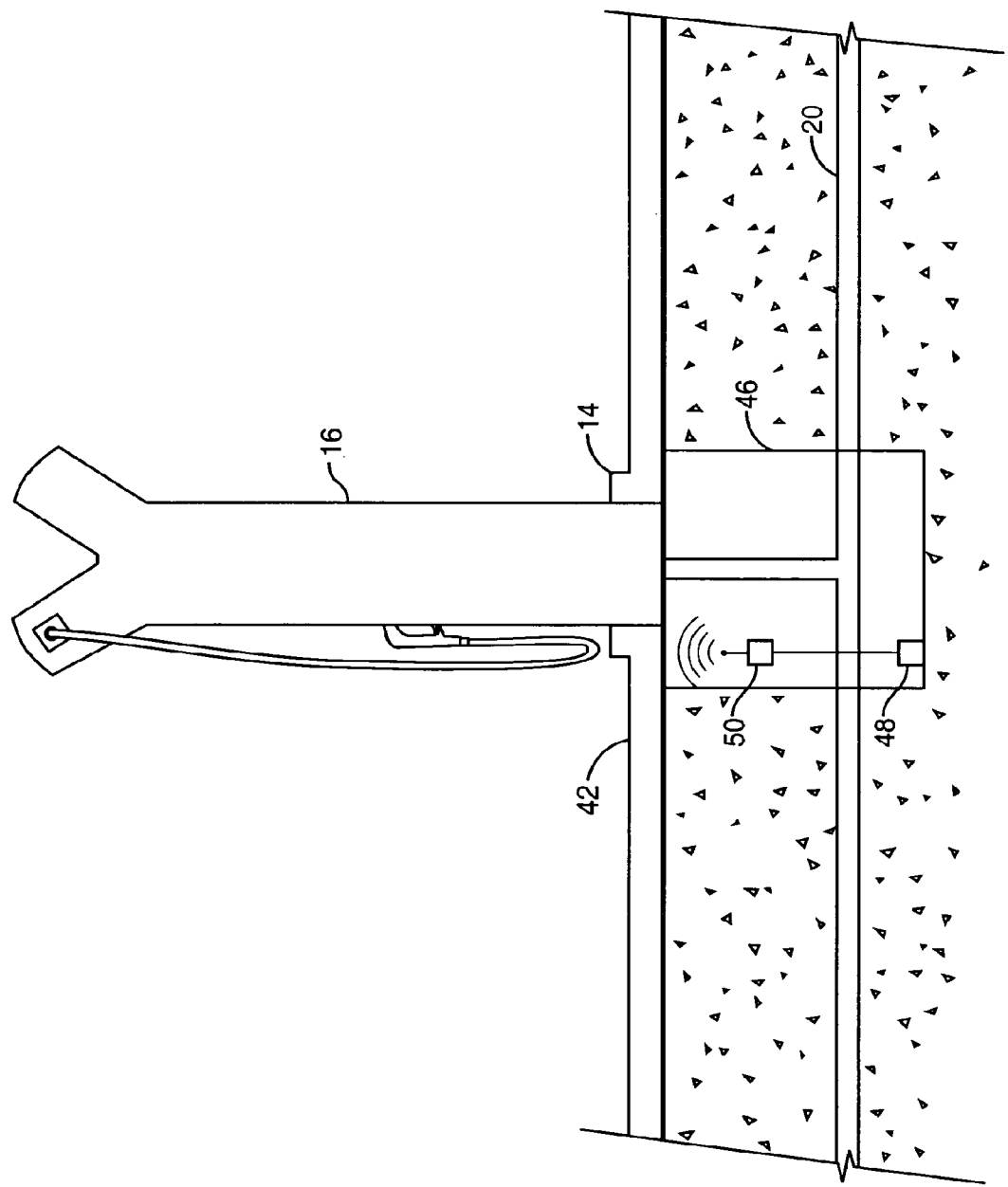
FIG. 3 illustrates a sump associated with a fuel dispenser and a transceiver of the present invention positioned within the sump.

FIG. 3 illustrates a fuel dispenser 16 associated with a fuel dispenser sump 46. The piping network 20 extends through the fuel dispenser sump 46, and a branch conduit (not labeled) extends up into the fuel dispenser 16, as is well understood. A sump probe 48 is positioned within the fuel dispenser sump 46 to detect fluid within the fuel dispenser sump 46. The sump probe 48 may be a MAG SUMP SENSOR sold by Veeder-Root Company, or other comparable probe. The sump probe 48 is connected to a sump wireless transceiver 50 via a conventional probe cable. The data from the sump probe 48 is formatted onto a carrier signal and broadcast. The sump wireless transceiver 50 is designed to communicate with the site communicator wireless transceiver 28. Generically, tank wireless transceiver 44 and sump wireless transceiver 50 are referred to herein as sensor wireless transceivers.

Figure 4:
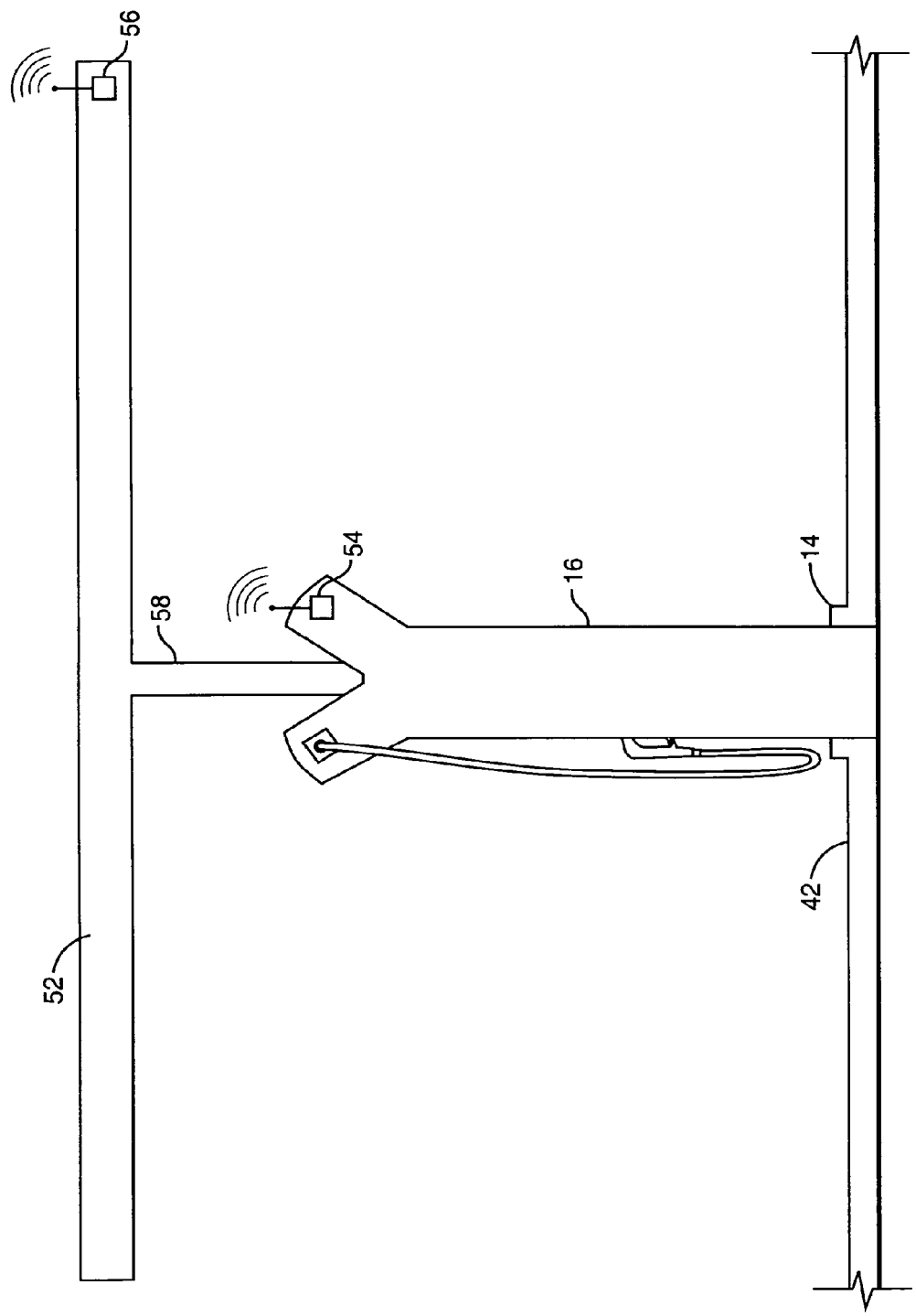
FIG. 4 illustrates a repeater of the present invention positioned on a fuel dispenser and a second repeater positioned on a canopy associated with the fueling environment.
Figure 5:
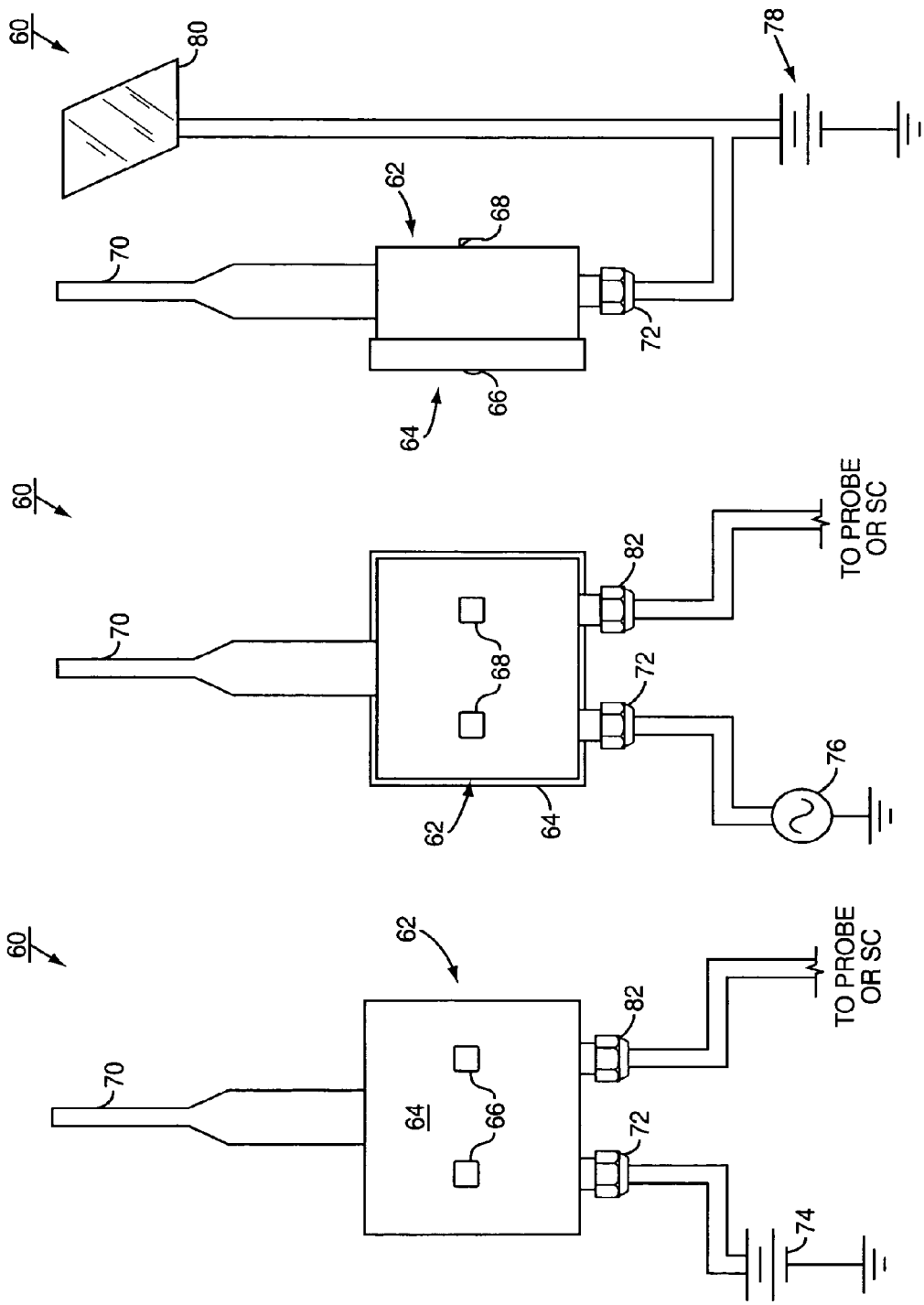
FIG. 5A illustrates a front view of a transceiver/repeater box connected to a battery power supply.
FIG. 5B illustrates a back view of a transceiver/repeater box connected to an AC power supply.
FIG. 5C illustrates a side view of a transceiver/repeater box connected to a hybrid solar based power supply.

FIG. 4 illustrates a fuel dispenser 16 covered by a canopy 52. Canopy 52 covers a portion of the forecourt concrete slab 42 so that users may fuel their vehicles without being unnecessarily exposed to environmental conditions, such as rain, and to provide lighting to the user at night. A fuel dispenser repeater 54 is positioned on fuel dispenser 16, preferably near the top portion of the fuel dispenser 16. The fuel dispenser repeater 54 may be positioned in alternate locations on the fuel dispenser 16 such as within the face of the user interface, proximate the bottom of the fuel dispenser 16, or other position as needed or desired. However, a higher position is preferred as this reduces the likelihood that line of sight to the site communicator wireless transceiver 28 is blocked by a car or similar transient obstruction.

FIG. 4 also illustrates an additional repeater, namely a canopy repeater 56, which is positioned on the canopy 52. While the canopy repeater 56 is shown positioned proximate to an edge of the canopy 52, alternate placements on the canopy 52 are possible, and in fact, the canopy repeater 56 could be positioned on a support pole 58 if needed or desired. While the fuel dispenser repeater 54 and the canopy repeater 56 are shown, it is within the scope of the present invention to provide repeaters on other stationary elements within the fueling environment 10 as needed or desired. Preferably, any such alternate location is elevated and is communicatively coupled to the site communicator wireless transceiver 28 and at least one of the sensor transceivers 44, 50.

It should be appreciated that while the present disclosure treats the sensor transceivers 44, 50 differently from the site communicator wireless transceiver 28 and the repeaters 54, 56, all these elements are transceivers and contain electronic circuitry capable of sending and receiving electromagnetic signals. The transceivers of sensor transceivers 44, 50, the site communicator wireless transceiver 28, and the repeaters 54, 56 are generically referred to herein as transceivers 60. In a preferred embodiment, the transceivers 60 may be made by AeroComm of 10981 Eicher Drive, Lenexa, Kans. 66219, and the electromagnetic signals are at 900 MHz, 868 MHz or 433 MHz using a frequency hopping spread spectrum (FHSS) modulation scheme. It should be appreciated that such frequencies are currently preferred, but that other frequencies could be used if needed or desired.

While it is possible that there are a number of potential arrangements for each transceiver 60, FIGS. 5A-5C illustrate an exemplary structure along with a variety of power options. Each transceiver 60 includes a box 62, and, as better illustrated in FIG. 5C, the box 62 has a lid 64, which helps enclose the box 62. Together the box 62 and the lid 64 make a liquid tight enclosure for the electronic components of the transceiver 60. In a more preferred embodiment, the box 62 and the lid 64 make an intrinsically safe container such that the transceiver 60 may be positioned in a location that is exposed to fuel vapors. The lid 64 may be secured to the box 62 via screws 66 as shown in FIGS. 5A and 5C. Box 62 may be secured to a vertical surface via mounting brackets 68 as shown in FIGS. 5B and 5C, or other mounting mechanism as needed or desired. A conventional monopole antenna 70 extends from the box 62 and is enclosed in a nonconductive material such that the monopole antenna 70 does not create a spark risk or otherwise compromise the intrinsically safe nature of the transceiver 60. Other antenna arrangements are also possible including but not limited to: a dipole antenna, a patch antenna, an F-antenna, or the like as needed or desired.

The box 62 has a first connector 72 that connects the electronics of the transceiver 60 to a power supply. The power supply can be one of several different power sources. In FIG. 5A, the power source is a battery 74. In FIG. 5B, the power source is an AC power supply 76. In FIG. 5C, the power source is a battery 78 that is recharged via a solar cell 80. As shown in FIGS. 5A and 5B, the box 62 has a second connector 82 which connects to a conventional cable that is connected to either the probe (tank probe 36 or sump probe 48) or the site communicator 22. An exemplary cable is an RS-485 cable, although other such cables are contemplated depending on the exact nature of the probe 36, 48, the site communicator 22, and/or the transceiver 60.

In an exemplary embodiment, the tank wireless transceiver 44 operates on batteries 74; the sump wireless transceiver 50 operates on an AC power supply 76 from the fuel dispenser 16; and the repeaters 54, 56 operate on either an AC power supply 76 from the fuel dispenser 16 or a hybrid power supply with the solar cell 80 positioned on top of the canopy 52 so that it is well positioned to receive copious amounts of sunlight. The site communicator wireless transceiver 28 preferably transmits at 500 mW, while the sensor transceivers 44, 50 and the repeaters 54, 56 transmit at 100 mW.

Figure 6:
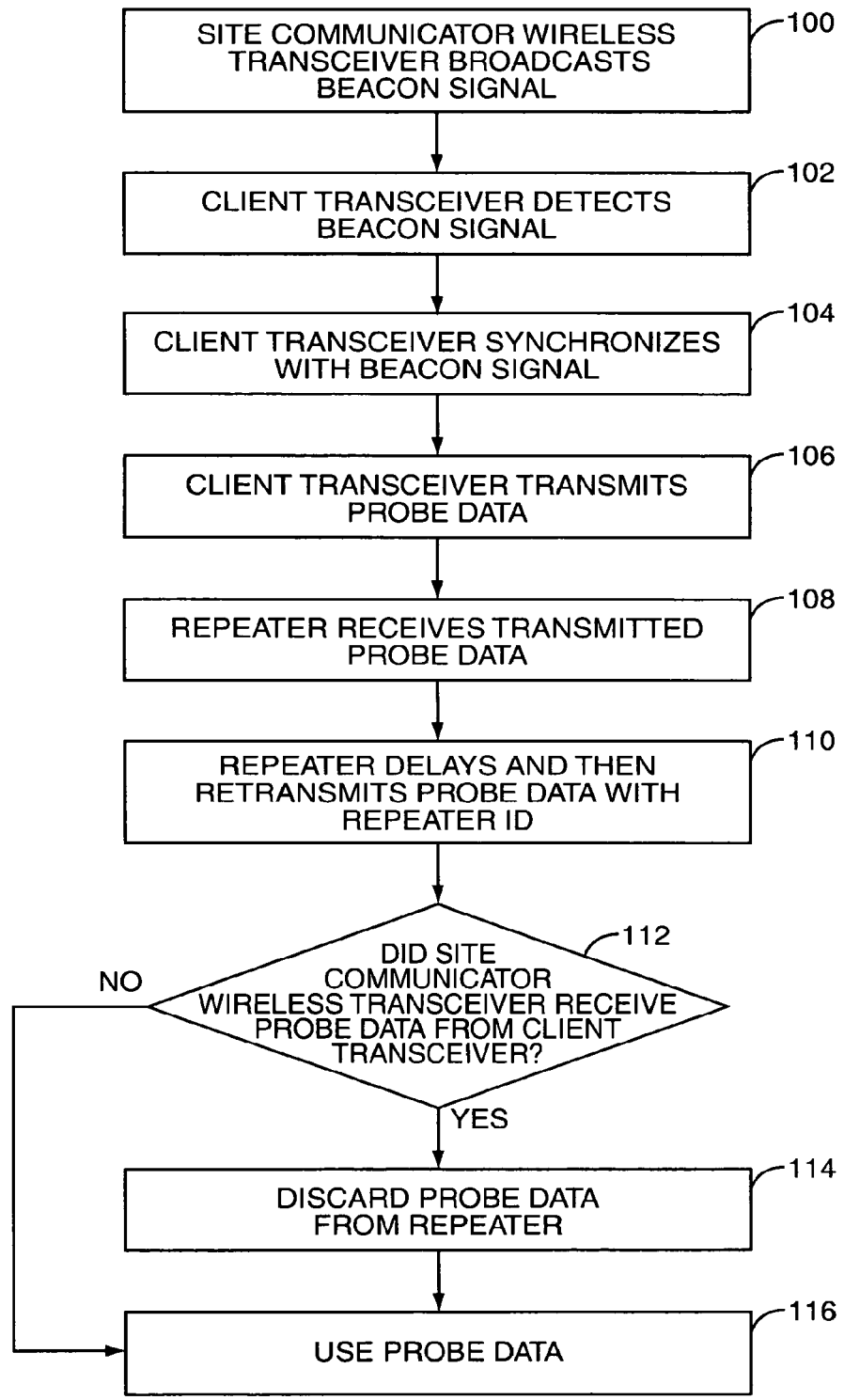
FIG. 6 illustrates a flow chart showing an exemplary communication process of the present invention.

FIG. 6 illustrates a flow chart of an exemplary embodiment of the transceivers and repeaters of the present invention in use where the repeaters 54, 56 retransmit received probe data with a delay in case the site communicator 22 did not receive the probe data directly from the sensor transceivers 44, 50.

In particular, the site communicator wireless transceiver 28 broadcasts a beacon signal (block 100). This beacon signal may be broadcast several times per second. The client transceiver (sensor transceivers 44, 50) detects the beacon signal (block 102). The client transceiver synchronizes with the beacon signal (block 104). Periodically, the client transceiver will receive data from the probes 36, 48 associated with the client transceiver and will format the probe data for transmission. An exemplary format for transmission is explored below with reference to FIG. 8. After assembly into a suitable format, the client transceiver transmits the probe data (block 106). The repeaters 54, 56 then receive the transmitted probe data (block 108).

The repeaters 54, 56 delay a random amount of time (so as to avoid collisions), and then retransmit the probe data with the repeater ID added to the original message from the client transceiver (block 110). An exemplary format for this signal is described below with reference to FIG. 9. The site communicator wireless transceiver 28 receives the probe data from the repeaters 54, 56 and determines if the probe data was received from the client transceiver directly (block 112). Note that the actual determining may be performed by a processor within site communicator 22 or within the site communicator wireless transceiver 28, as needed or desired. As used herein, "the site communicator determines" includes determining in either location.

If the site communicator wireless transceiver 28 received the probe data from the client transceiver directly (i.e., the answer to block 112 is yes), then the site communicator 22 discards the probe data from the repeaters 54, 56 (block 114) and the site communicator 22 uses the probe data (block 116) as desired. If however, the answer to block 112 is no, the site communicator 22 did not receive the probe data from the client transceiver, then the site communicator 22 uses the probe data (block 116) provided by the repeaters 54, 56.

Figure 7:
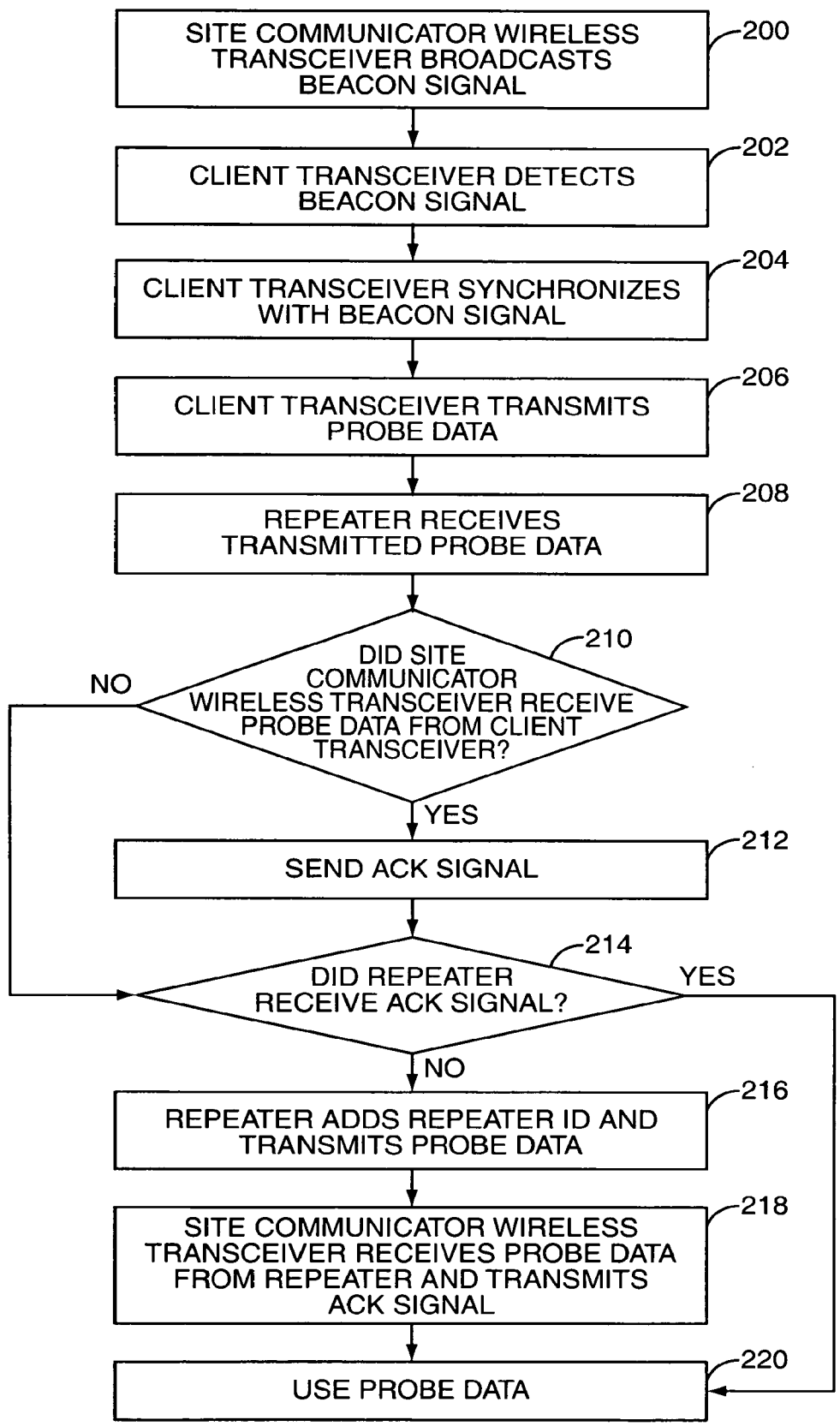
FIG. 7 illustrates a flow chart showing an alternate communication process of the present invention.

An alternate embodiment of the methodology of the present invention is presented in FIG. 7 where the repeaters 54, 56 do not repeat transmission of the probe data unless the site communicator 22 did not receive the probe data from the sensor transceivers 44, 50.

In particular, the site communicator wireless transceiver 28 broadcasts a beacon signal (block 200). This beacon signal may be broadcast several times per second. The client transceiver sensor (transceivers 44, 50) detects the beacon signal (block 202). The client transceiver synchronizes with the beacon signal (block 204). Periodically, the client transceiver will receive data from the probes 36, 48 associated with the client transceiver, and will assemble the probe data into a format appropriate for transmission. After assembly into a suitable format, the client transceiver transmits the probe data (block 206). The repeaters 54, 56 then receive the transmitted probe data (block 208).

The site communicator wireless transceiver 28 determines if the site communicator wireless transceiver 28 received the probe data from the client transceiver directly (block 210). Again, note that this determining may be done by the site communicator wireless transceiver 28 or the site communicator 22, as needed or desired. If the answer to block 210 is yes, the site communicator wireless transceiver 28 did receive the probe data from the client transceiver, then the site communicator wireless transceiver 28 sends an acknowledgement (ACK) signal (block 212).

If the answer to block 210 is no, the site communicator wireless transceiver 28 did not receive the probe data from the client transceiver (or as part of the normal processing after sending the ACK signal), the repeaters 54, 56 determine if the repeaters 54, 56 received the ACK signal (block 214). If the answer is no, the repeaters 54, 56 have not received the ACK signal, then the repeaters 54, 56 add the repeater ID to the probe data and transmit the probe data (block 216). The site communicator transceiver 28 receives the probe data from the repeaters 54, 56 and transmits an ACK signal (block 218). Then, either as a result of the site communicator wireless transceiver 28 receiving the probe data from the client transceiver or the repeaters 54, 56, the site communicator 22 uses the probe data as normal (block 220).

It should be appreciated that in both embodiments, the initial transmission of the probe data from the client transceiver may be repeated periodically for a set number of times. For example, the client transceiver may repeat its transmission every sixteen milliseconds for sixteen times in an exemplary embodiment. Other periods and numbers of retransmissions are also possible. Likewise, the repeaters 54, 56 may transmit the probe data periodically for a set number of times. In the exemplary embodiment, the repeaters 54, 56 may retransmit the probe data every sixteen milliseconds for up to sixteen times, or until an ACK signal is received as needed or desired. Again, the precise numbers may be varied as needed or desired. The numbers presented herein are for the purposes of example, and are not intended to be limiting.

Figures 8, 9:
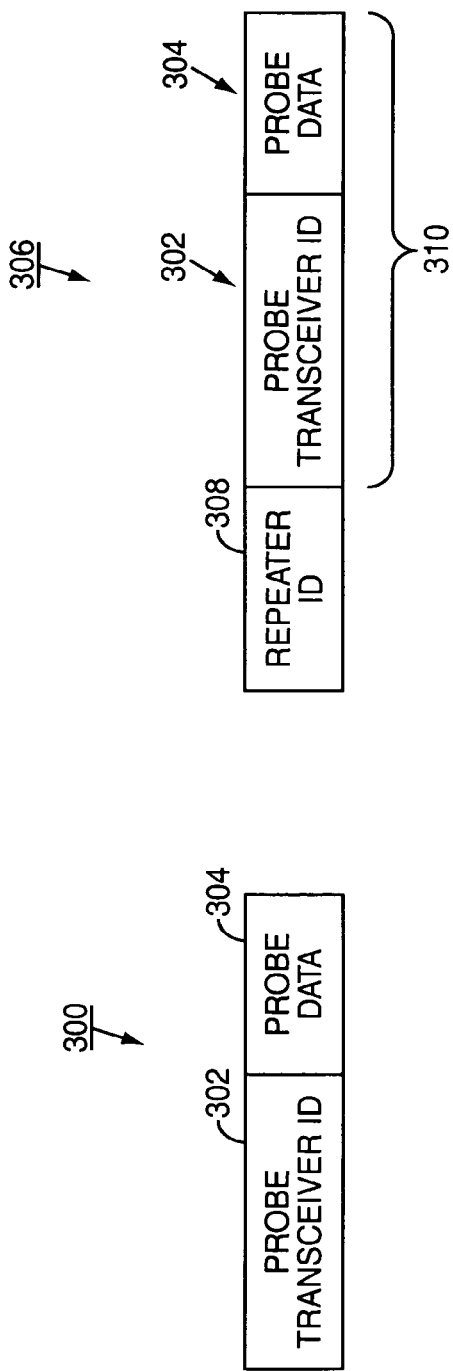
FIG. 8 illustrates a packet sent from the sensor transceiver.
FIG. 9 illustrates a packet sent from the repeater transceiver.

Exemplary formats for the signals are presented in FIGS. 8 and 9, although any format may be used with the present invention. FIG. 8 illustrates a packet 300 sent from a client transceiver (sensor transceiver 44 or 50). The packet 300 is approximately one hundred bytes long, and includes the packet header 302, which includes the probe transceiver identification so that the site communicator 22 knows from which client transceiver the probe data originated, and the payload 304, which includes the probe data. FIG. 9 illustrates the packet 306 from the repeaters 54, 56. The packet 306 is similar to the packet 300, and includes a new header 308, which has the repeater identification such that the site communicator 22 knows from which repeater 54, 56 the packet originated, as well as a modified payload 310 which includes the original probe transceiver identification and the original probe data. In this manner, the site communicator 22 can determine from where the probe data originated.

It should be appreciated that alternate packet structures can be used if needed or desired. The packets presented herein are by way of example and are not intended to be limiting. Further, the present invention is not limited to any particular type of probe or sensor, transceiver, or site communicator.

Those skilled in the art will recognize improvements and modifications to the preferred embodiments of the present invention. All such improvements and modifications are considered within the scope of the concepts disclosed herein and the claims that follow.

The invention claimed is:

1. A wireless communication system in a fueling environment at a fuel dispensing site, comprising:
    a first sensor adapted to detect a condition in the fueling environment;
    a first wireless transceiver associated with said first sensor;
    a repeater positioned in the fueling environment for repeating transmissions from the first wireless transceiver; and
    a second wireless transceiver associated with a site communicator at the fuel dispensing site, wherein said site communicator receives data from said first sensor through said first wireless transceiver, said repeater, and said second wireless transceiver.

2. The wireless communication system of claim 1, wherein said first sensor is selected from a group consisting of: a tank probe and a fuel dispenser sump probe.

3. The wireless communication system of claim 1, wherein said second wireless transceiver broadcasts a beacon signal.

4. The wireless communication system of claim 3, wherein said first wireless transceiver receives said beacon signal and synchronizes thereto.

5. The wireless communication system of claim 1, wherein said first wireless transceiver is powered by a battery.

6. The wireless communication system of claim 5, wherein said battery is recharged via solar energy.

7. The wireless communication system of claim 1, wherein said site communicator is selected from a group consisting of: a tank monitor and a site controller.

8. The wireless communication system of claim 1, wherein said first wireless transceiver initially transmits sensor data and said site communicator receives said sensor data from said first wireless transceiver and subsequently, after a predefined delay, from said repeater.

9. The wireless communication system of claim 1, wherein said first wireless transceiver is powered by an AC power source.

10. The wireless communication system of claim 1, wherein said repeater is positioned on a fuel dispenser.

11. The wireless communication system of claim 1, wherein said repeater is positioned on a canopy.

12. The wireless communication system of claim 1, wherein said repeater receives a signal from said first wireless transceiver.

13. The wireless communication system of claim 1, wherein said first wireless transceiver communicates at a frequency selected from a group consisting of: 900 MHz, 866 MHz, and 433 MHz.

14. The wireless communication system of claim 1, wherein said site communicator uses said data.

15. The wireless communication system of claim 1, further comprising a plurality of repeaters positioned in the fueling environment.

16. The wireless communication system of claim 15, wherein said plurality of repeaters repeat a transmission including the data as received from said first sensor to the site communicator.

17. A method of reporting probe data in a fueling environment at a fuel dispensing site, said method comprising:
    receiving sensor data at a first wireless transceiver from a sensor in the fueling environment;
    wirelessly transmitting the sensor data, creating transmitted sensor data;
    receiving at a repeater a transmission from the first wireless transceiver comprising the transmitted sensor data;
    repeating the transmission comprising the transmitted sensor data via the repeater; and
    receiving the transmitted sensor data at a site communicator at the fuel dispensing site via a second wireless transceiver.

18. The method of claim 17, wherein receiving sensor data comprises receiving sensor data from either a tank probe or a fuel dispenser sump probe.

19. The method of claim 17, further comprising broadcasting a beacon signal from the site communicator.

20. The method of claim 19, further comprising detecting, at the first wireless transceiver, the beacon signal.

21. The method of claim 20, further comprising synchronizing the first wireless transceiver to the beacon signal.

22. The method of claim 17, further comprising powering the first wireless transceiver with either a battery or an AC power source.

23. The method of claim 17, further comprising powering the repeater with either a battery or an AC power source.

24. The method of claim 17, further comprising sending, from the site communicator, an acknowledgement signal upon receipt of the transmitted sensor data.

25. The method of claim 24, wherein repeating the transmission from the repeater does not occur if the repeater receives the acknowledgement signal.

26. The method of claim 24, wherein repeating the transmission from the repeater occurs regardless of whether the repeater receives the acknowledgement signal.

27. The method of claim 17, wherein receiving the transmitted sensor data comprises receiving the transmitted sensor data at the site communicator from the first wireless transceiver and the repeater.

28. The method of claim 17, further comprising positioning the repeater on a fuel dispenser.

29. The method of claim 17, further comprising positioning the repeater on a canopy in the fueling environment.

30. The method of claim 17, wherein wirelessly transmitting the sensor data comprises wirelessly transmitting at a frequency selected from a group consisting of: 900 MHz, 866 MHz, and 433 MHz.

31. The method of claim 17, wherein repeating the transmission from the repeater comprises delaying a predetermined amount of time before repeating the transmission.

32. The method of claim 17, wherein receiving the transmitted sensor data at a repeater comprises receiving the transmitted sensor data at a plurality of repeaters.

33. The method of claim 32, further comprising repeating transmission of the transmitted sensor data from each of the plurality of repeaters.

34. A method of reporting probe data in a fueling environment at a fuel dispensing site, said method comprising:
- receiving sensor data at a first wireless transceiver from a sensor in the fueling environment;
- wirelessly transmitting the sensor data, creating transmitted sensor data;
- receiving the transmitted sensor data at a repeater;
- retransmitting the transmitted sensor data from the repeater;
- receiving the transmitted sensor data at a site communicator at the fuel dispensing site via a second wireless transceiver; and
- sending, from the site communicator, an acknowledgement signal upon receipt of the transmitted sensor data.

35. The method of claim 34, wherein retransmitting the transmitted sensor data from the repeater does not occur if the repeater receives the acknowledgement signal.

36. The method of claim 34, wherein retransmitting the transmitted sensor data from the repeater occurs regardless of whether the repeater receives the acknowledgement signal.

* * * * *